United States Patent Office 3,000,241
Patented Sept. 19, 1961

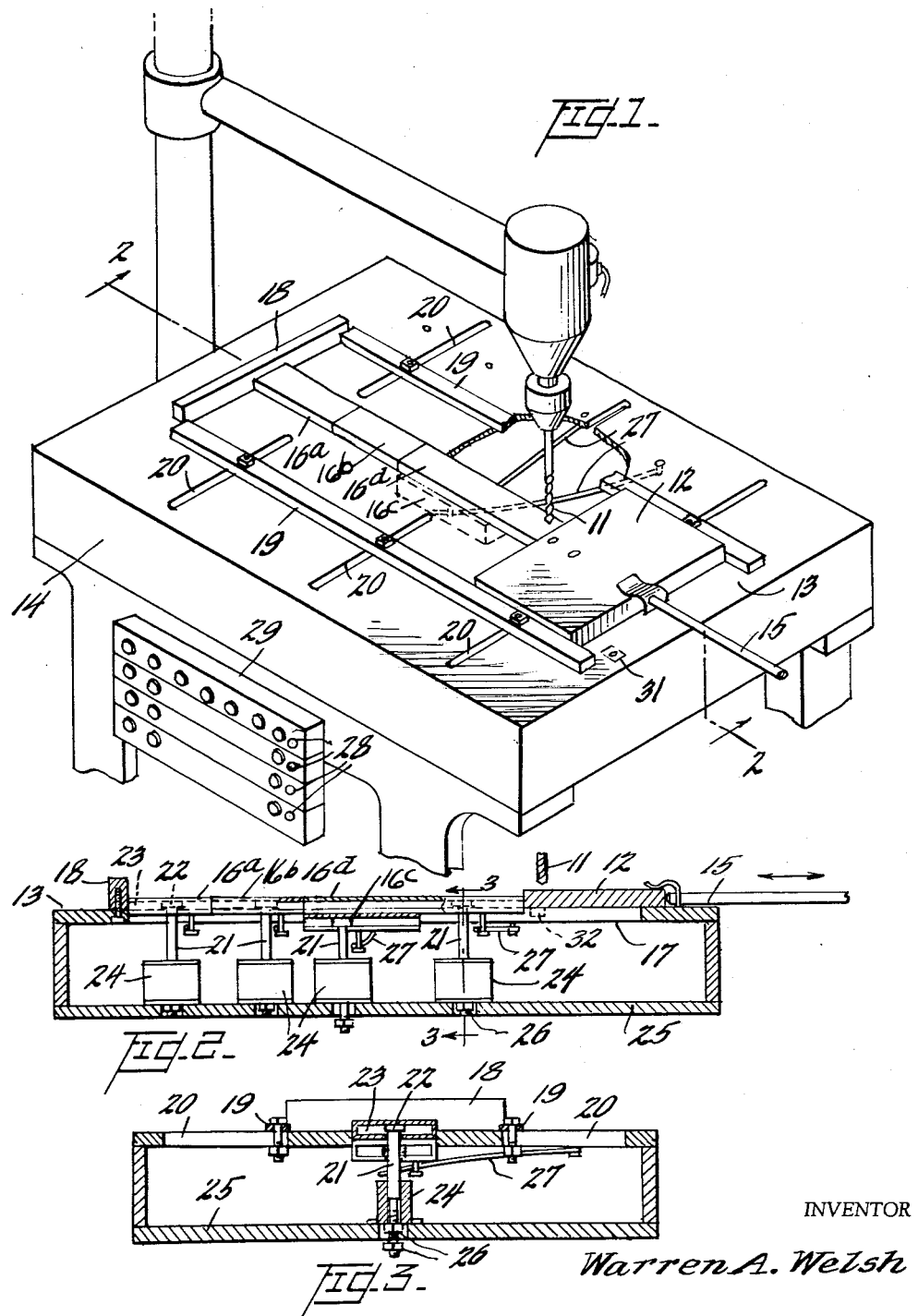

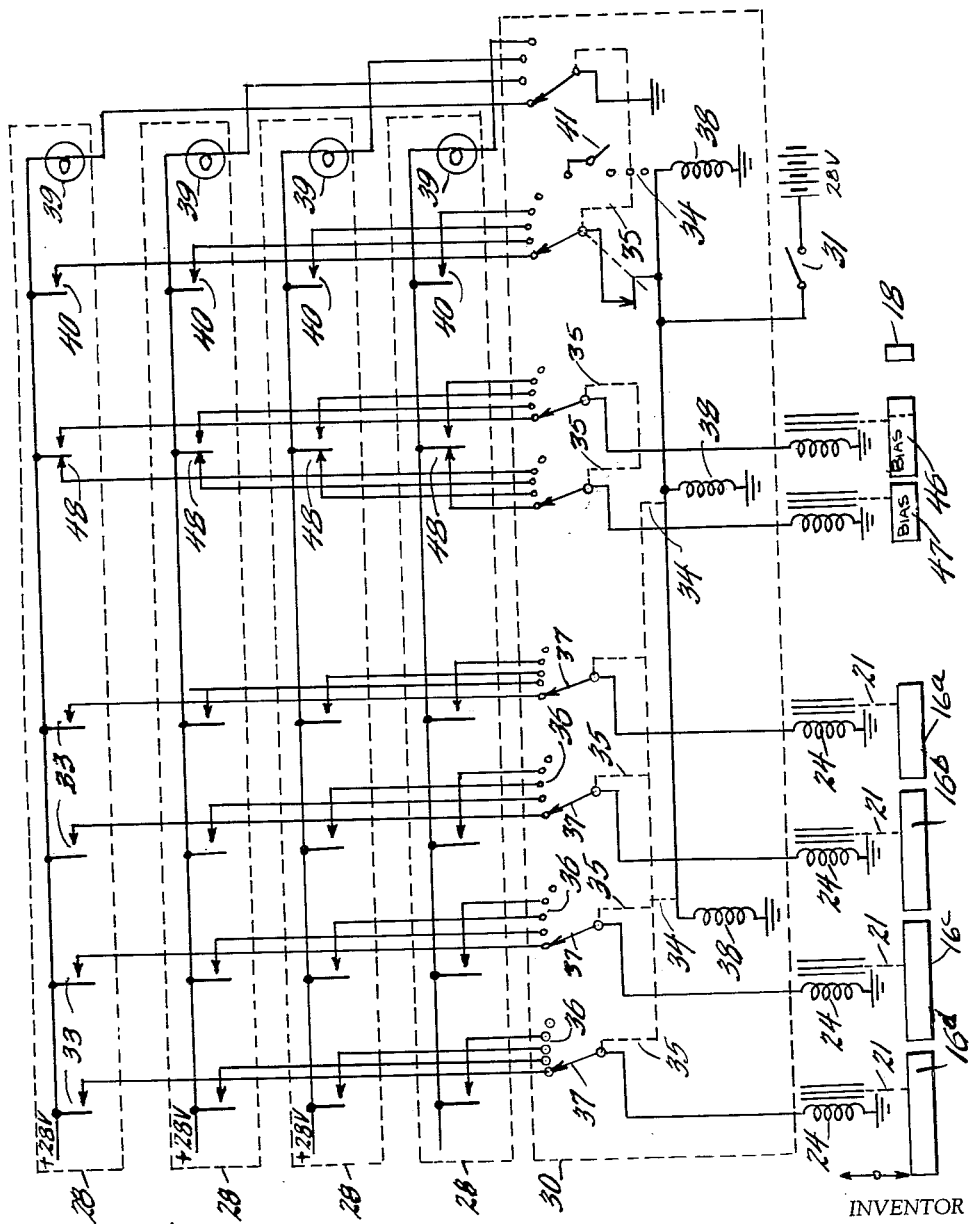

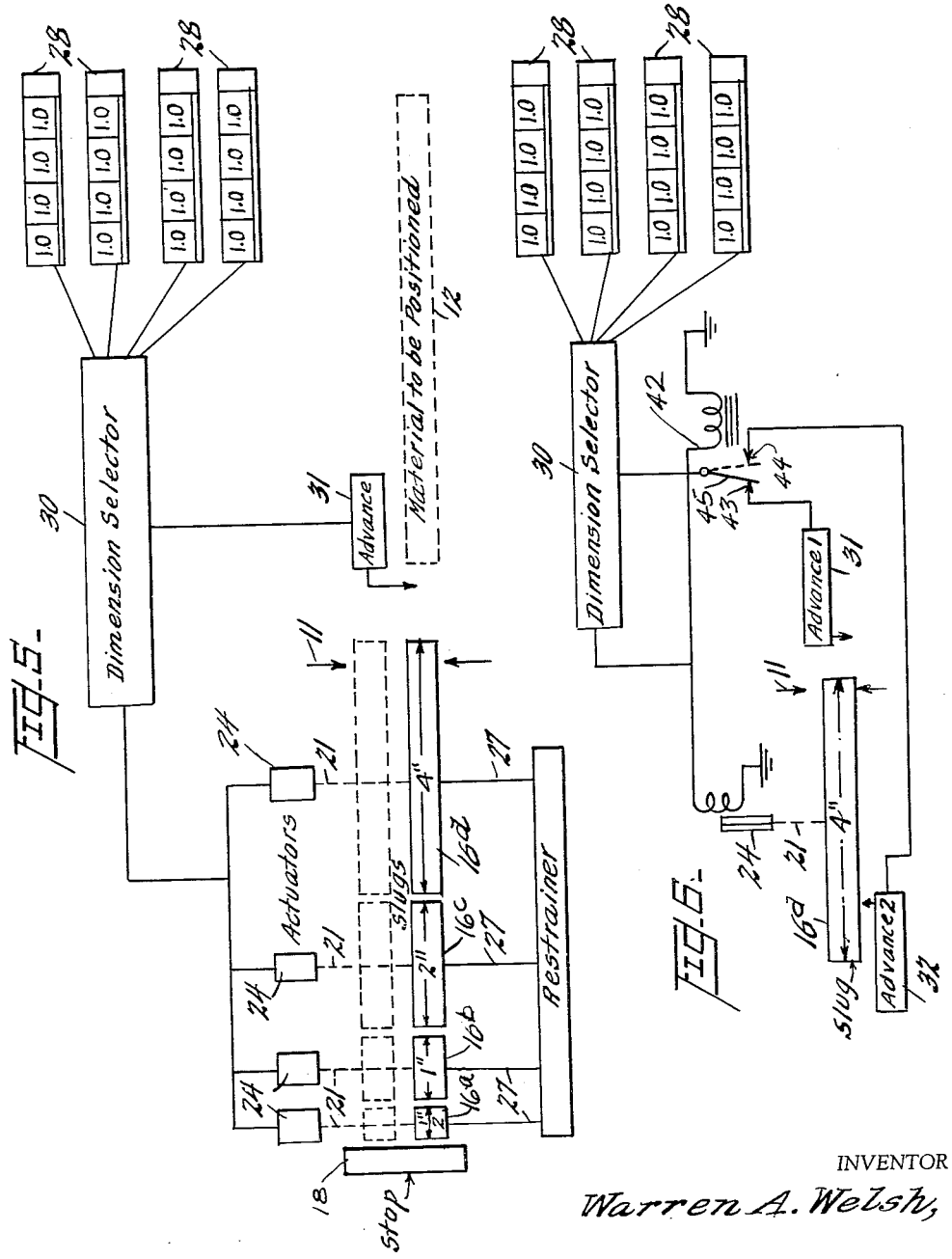

3,000,241
POSITIONING DEVICES
Warren A. Welsh, Westfield, N.J., assignor to Western Electric Company, Incorporated, New York, N.Y., a corporation of New York
Filed Sept. 12, 1958, Ser. No. 760,772
13 Claims. (Cl. 77—64)

This invention relates to positioning devices and more particularly to a binary positioning device for locating a piecepart with respect to a machine tool, or the like, for the performance of a work operation thereon.

In many manufacturing processes it is necessary to position material with respect to a machine tool in order to perform a series of operations upon the material. Such a condition arises in the punching or drilling of sheets of material of plastic, metal, or other compositions. At present when it is required that a piece of material be successively positioned for the performance of a work operation thereon, such as the drilling of holes at selected positions, it may be done by making a layout of the work positions on the workpiece at which an operation is to be performed. The part may then be manually positioned with respect to the machine tool which is to perform the operation.

Another method of positioning a workpiece for the performance of a series of work operations is the use of a multiplicity of preset stops along one direction of movement of the workpiece, the stops acting to locate the workpiece in a desired position with respect to a working tool. The presently known methods of positioning a workpiece with respect to a machine tool require extensive setup time, are quite inflexible, and extremely limited in the number of positions which may be preset. In present day mass manufacturing techniques these conditions constitute great disadvantages.

It is an object of this invention to provide a new and improved positioning device.

It is a further object of this invention to provide new and improved binary work positioning devices for locating a workpiece with respect to a machine tool, or the like.

It is a still further object of this invention to provide a binary work positioning device that is capable of sequentially locating a workpiece at a great number of preselected positions.

One embodiment of the invention may include a plurality of gauge blocks of differing lengths, such that any selected length of a fixed increment up to a predetermined maximum length may be formed by placing a combination of said gauge blocks into end-to-end alignment. By means of a plurality of actuating means, the gauge blocks are arranged in end-to-end alignment to locate a piecepart at a preselected position with respect to a working tool or the like, as determined by the combined lengths of the gauge blocks. Means are provided for selectively activating the actuating means to align the gauge blocks in any desired combination.

A complete understanding of the invention may be had from the following detailed description of a specific embodiment thereof, when read in conjunction with the appended drawings, wherein:

FIG. 1 is a perspective view of a work positioning device used in conjunction with a machine tool;

FIG. 2 is a vertical section taken along the line 2—2 of FIG. 1 showing gauge block supporting and actuating means;

FIG. 3 is a vertical view taken along the line 3—3 of FIG. 1 showing gauge block restraining means;

FIG. 4 is a diagrammatic view of the binary positioning device including four dimension registers, a dimension selector and associated circuits therefor, including both advance and reset features;

FIG. 5 is a block diagram of the positioning device illustrating its operation; and FIG. 6 is a schematic illustrating a modified embodiment incorporating a selective advance feature for controlling the positioning device.

Referring now to the drawings for a detailed description of the invention, FIG. 1 is a perspective view of the work positioning device used in conjunction with a machine tool. Reference numeral 11 indicates a vertically reciprocating drill with respect to which a piecepart 12, represented as a sheet of material, is to be positioned for the performance of a sequence of drilling operations thereon. The piecepart 12 may be reciprocated intermittently along a work surface 13 of a drill press 14 by means of a connecting rod 15 suitably connected to the piecepart 12 or by hand or other suitable means. The vertically disposed drill 11, designed to reciprocate in any well-known fashion, remains in its upper position to permit passage of the piecepart and descends to perform the work operation.

A plurality of rectangularly shaped gauge blocks 16a to 16d, inclusive, slidably disposed in end-to-end relationship in a groove 17 project above the work surface 13 and cooperate with a fixed stop 18 to position the piecepart 12 with respect to the vertically disposed drill 11. The gauge blocks 16a—16d, preferably formed of a nonmagnetic material such as brass, are each of a differing length and are supported retractably in the path of advancement of the piecepart so as to be readily arranged in a desired combination to position the foremost edge of the piecepart 12 with the vertical axis of the drill 11 at a desired dimension. Disposed on either side of the groove 17 and extending parallel thereto are a pair of work jigs 19—19 secured in slots 20—20 formed in the work surface 13. The jigs 19—19 may be adjustably attached to the work surface 13 to accept any width of a piecepart 12 up to the length of the slots 20—20 by suitable fastening means such as a threaded nut and bolt extending through the jigs 19—19 and the slots 20—20. In this fashion the jigs 19—19 may be positioned with respect to the vertical axis of the drill to fix the dimensions of each coordinate position along one axis.

Referring to FIGS. 2 and 3, the gauge blocks 16a—16d are supported within the groove by means of armatures 21—21 which have T-shaped end portions 22—22 extending into a T-shaped groove 23 in the underface of each of the gauge blocks 16a—16d. The T-shaped grooves 23 extend along a length of each of the gauge blocks 16a—16d and permit them to slide over the T-shaped ends 22—22 of the armatures 21—21 when longitudinally displaced in the groove 17. It is apparent that gauge block 16a, the one nearest the fixed stop when the device is in an inoperative position, need not have a groove 23 since at no time is it longitudinally displaced in the groove 17. The armatures 21—21 are adjustably secured within cylindrically shaped solenoid actuators 24—24 suitably mounted on a plate 25 by means of an adjusting nut 26. Spring-biased restrainers 27—27, formed of a suitable flexible material of some strength such as steel, or the like, are affixed to each of the gauge blocks 16a—16d at one end and to the work table at the other end and act to return the gauge blocks 16a—16d to their normal positions upon longitudinal displacement within the groove 17. A plurality of dimension registers 28—28 mounted in a suitable control panel 29 conveniently located near the drill press 14 act to selectively energize the solenoid actuators 24—24 in any desired combination, while a dimension selector 30 (FIG. 4), controlled by advance switch 31, sequentially selects the dimension registers 28—28, as will be more fully described hereinafter in connection with FIGS. 4 and 5.

As before stated, the gauge blocks 16a—16d, inclusive, are formed in differing graduated lengths in order to position the piecepart 12 in as many unique positions as possible with respect to the drill 11, and are normally arranged in the groove 17 in a descending order by length, the end of the gauge block 16d having the greatest length coinciding with the vertical axis of the drill 11. Thus when none of the gauge blocks 16a—16d, inclusive, are removed from the path of advancement of the piecepart 12, the foremost edge of the piecepart 12 will be directly aligned with the drill 11. By arranging a desired combination of gauge blocks 16a—16d, the piecepart 12 may be positioned with respect to the drill 11 at any desired position of a fixed even increment up to a predetermined maximum as determined by the horizontal distance between the face of the stop 18 and the vertical axis of the drill 11.

For determining the lengths of the respective gauge blocks 16a—16d, it is necessary to determine the maximum length along which the drilling operation is desired to be performed; and, secondly, the shortest distance required between any two adjacent holes or other operation to be performed on a piecepart 12. Having selected these dimensions it may be shown that any number greater than zero, including whole or fractional numbers can be expressed as the summation of $(A2^N)$ where A has the value of 1 or 0 and N has values ranging from $+\alpha$ to $-\alpha$. This may be expressed as $$X = \sum_{N=-\alpha}^{N=+\alpha} A2^N$$

where: $A = 1$ or $0$.

If now, for example, the maximum length of gauge blocks is 7½ inches and it is desired to choose the lengths of gauge blocks so that any distance of an even ½ inch increment or more may be arranged, $X = 7½$ inches can be expressed as:

$$X = 7½'' = \sum_{N=-1}^{N=2} A2^N$$

where: $A = 1$ or $0$.

In binary language, X, as limited above, may be expressed as four bits of information. That is taking four bits or positions, any number of an even ½ inch increment up to a maximum value of $X = 7½$ inches, may be expressed by a combination of the numbers $A = 1$ or $0$. For instance, $X = 5$ inches would be represented as follows:

```
5" = 1   0   1   0    Binary Number A = 1 or 0
     2   1   0  -1    Exponent of 2 or N
5" = 4   0   1   0—   Numbers to be summed
```

Similarly, any limit of X may be expressed in any even increment desired by choosing the proper limits for the quantity N.

Referring now to FIG. 5, a schematic view representing the positioning device previously described under FIGS. 1-3, illustrates the mode of operation utilizing this binary concept. As shown, the device has been limited to a four bit number ($N = -1$ to $N = +2$) merely as an example. The maximum length for purposes of this example is $X = 7½''$, and the desired fixed incremental length is ½''. As is apparent, a greater number of bits of information may be used if desired and as is readily shown, the greater the negative number of bits ($N = -\alpha$) the smaller the fixed increment, using the equation for X as previously defined.

The number of gauge blocks 16a—16d required is based upon the number of bits or values of N for any given system, and in this case, where $N = +2$ to $-1$, four are required. Expressing the length of each of the gauge blocks 16a—16d as $X = A2^N$ for each value of N, A remaining the quantity one in each instance, it is readily shown that four gauge blocks 16a—16d of the respective lengths of 4'', 2'', 1'', and ½'', may be arranged to provide any length up to a maximum of 7½ at even ½'' increments. By designating a gauge block 16 to be withdrawn as the numeral 1 and a gauge block 16 to remain in its normal position as a "0," any one of the above-mentioned unique positions may be expressed by a binary four-bit number 000.0 to 111.1. Binary information representing each position may be set in on the dimension registers 28—28, each of which represents one dimension. The dimension selector 30 applies the binary information in the dimension registers 28—28 to the solenoid actuators 24—24 associated with gauge blocks 16a—16d, respectively, to withdraw any desired combination of gauge blocks 16a—16d from the path of advancement of the piecepart 12.

Upon completion of a work operation and as the piecepart 12 is withdrawn, the spring-biased restrainers 27—27 return the gauge blocks 16a—16d that have been longitudinally displaced by the piecepart 12 to their normal position. Upon a complete withdrawal of the piecepart 12, the piecepart 12 trips the advance switch 31 which operates the dimension selector 30 which in turn advances to select and read out the information on the next dimension register 28. This information, when applied to the solenoid actuators 24—24, sets up the gauge blocks 16a—16d for the next work operation. By using a plurality of dimension registers 28—28, the piecepart 12 may be positioned sequentially at any desired number of selected positions.

Referring to FIG. 4, a schematic diagram of the electrical control circuit of the binary positioning device is shown. The dimension registers 28—28 include a series of single pole, single throw switches 33—33 connected on one side to a common voltage source (not shown). Each of the switches 33—33 represents one bit of information of a binary number to be set in the dimension registers 28—28, namely a "1" in its closed position, and a "0" in its open position. It is obvious that more complex devices could be used for the dimension registers 28—28, for example, a tape or punched card reading machine.

The dimension selector 30 is a conventional selector switch and includes multibank stepping switches 34—34, each of which includes bank stepping switches 35—35. Each of the bank stepping switches 35—35 includes a plurality of contacts 36—36 which are connected to one side of the single pole, single throw switches 33—33 making up the dimension registers 28—28. A wiper arm 37 of each of the bank stepping switches 35—35 connects the dimension selector 30 to solenoid actuators 24—24. The armature 21 associated with each of the solenoid actuators 24—24 is mechanically connected with one of the respective gauge blocks 16a—16d. The gauge blocks 16a—16d are preferably formed of a non-magnetic material to resist the magnetic field created upon energization of the solenoid actuators 24—24. Thus, when a switch 33 is closed the solenoid actuators 24—24, through contact 36—36 and wiper arm 37 of a bank selector switch 35, will be energized by the common voltage source to displace one of the gauge blocks 16—16. By closing the desired combination of switches 33—33 in a dimension register 28, any desired length of gauge blocks 16—16 of a fixed even increment may be displaced.

Upon the completion of a work operation and a partial withdrawal of the piecepart 12, the spring-biased restrainers 27—27 operate to return the gauge blocks 16a—16d, displaced longitudinally by the piecepart 12, to their normal position, while the gauge blocks 16a—16d, withdrawn by the energized solenoid actuators 24—24, remain in their displaced position. Upon further withdrawal, the piecepart 12 trips the advance switch 31 to energize the coils 38—38 of the multibank stepping switches 34—34 forming the dimension selectors 30 to simultaneously step each wiper arm 37 of the bank selector switches 35—35 to a next contact 36. In this fashion the dimension selector 30 is caused to advance to and read out the information on the next dimension register 28, and so on in a cyclic fashion at the completion of each work operation and the withdrawal of the piecepart 12. Thus by using a plurality of dimension registers 28—28, the piecepart 12 may be sequentially located at a number of preselected positions.

A bank stepping switch 35 may be used to operate pilot lamps 39—39 connected in series with the common voltage source of each of the dimension registers 28—28 to indicate the position of the dimension selector 30 and the selected dimension at all times during a sequence of operations. No-dimension switches 40—40, in each of the dimension registers 28—28, are controlled by an additional bank stepping switch 35. The switches 40—40, when closed, energize the operating coils 38—38 of the multibank stepping switches 34—34 to automatically advance the dimension selector 30 to a next position. By automatically advancing the dimension selector 30 to a next position, the gauge blocks 16a—16d remain in their normal position and no dimension would be indicated. A reset switch 41 may be provided to return the dimension selector 30 to its starting position at the end of each sequence. The reset switch 41 may also be arranged to return the dimension selector 30 to its starting position at any time during a sequence as is well known in the art.

As before stated, the piecepart 12 may be positioned at any even fixed increment. However, when it is desired to position the piecepart 12 at a large number of unique positions along a given length, it will be necessary to manipulate gauge blocks of a short length. This may become cumbersome and it may be desirable to add a biasing length to the shorter gauge blocks to make them more convenient to manipulate. Referring again to FIG. 4, a biasing length has been added to a gauge block 46 to illustrate this principle. An additional gauge block 47 of the same length as the bias length added to the gauge block 46 is also added. The gauge blocks 46 and 47 may be supported in the groove 17 and actuated by solenoid actuators 24—24 and their respective armatures 21—21, just as the gauge blocks 16a—16d as previously described.

Single pole, double throw switches 48—48 are provided on each of the dimension registers 28—28 and are arranged to withdraw one or the other of the respective biasing slugs 46 or 47, as previously described. An additional bank stepping switch 35 selects the single pole, double throw switch 48 of each of the dimension registers 28—28 upon actuation of the dimension selector 30. It is to be noted that the distance between the face of the stop 18 and the vertical axis of the drill 11, or other tool, will be increased by only the biasing length of one of the gauge blocks 46 or 47 since one or the other is withdrawn at all times. Thus by adding biasing lengths to the shorter gauge blocks as just illustrated, the positioning device may be used to locate a piecepart at any unique incremental position along a predetermined length.

For clarity, the gauge blocks 46 and 47 and their related operating mechanisms have not been shown in the embodiment illustrated in FIGS. 1–3, inclusive. However, this feature is illustrated in the schematic circuit diagram shown in FIG. 4 to demonstrate the ease with which it may be incorporated in this invention.

Referring to FIG. 6, a more selective advance feature for controlling the dimension selector 30 is shown in schematic form. Advance switch 31 is connected to operate the dimension selector 30 upon a complete withdrawal of the piecepart 12 from the positioning device. A second advance switch 32 is interconnected with advance switch 31 through a slow release relay 42 having fixed contacts 43 and 44 and movable contact 45. Fixed contact 43 is connected with advance switch 31, while fixed contact 44 is connected with advance switch 32. Movable contact 45 in its normal position connects the dimension selector 30 with advance switch 31. The slow release relay 42 is connected in parallel with a solenoid actuator 24 and both are energized by the dimension selector 30 reading out information on dimension register 28.

In operation, the selective advance switch 32 may be associated with and is located near the left end of the gauge block 16d towards the face of the fixed stop 18. Upon energizing the solenoid actuator 24, the gauge block 16d will be withdrawn from the path of advancement of the piecepart 12. At the same time slow release relay 42 is operated to switch the movable contact 45 from fixed contact 43 to fixed contact 44 to place the sensitive advance switch 32 in an operative position. Upon completion of the work operation and withdrawal of the piecepart 12, the piecepart 12 trips the selective advance switch 32 and advances the dimension selector 30 to select and read out the next dimension register 28. Upon actuation of the dimension selector 30, the solenoid actuator 24 is deenergized, thus deenergizing the slow release relay 42 to return the movable contact 45 to its normal contact position. However, the time delay of the slow release relay 42 prevents this from occurring until the dimension selector 30 has actually advanced to the next dimension register 28 and the gauge blocks 16a—16d have been arranged for the next work position. Thus, the sensitive advance switch 32 makes it unnecessary to completely withdraw the piecepart 12 to selectively operate the positioning device. By locating the sensitive advance switch 32, as in the present instance, the maximum amount of withdrawal of the piecepart 12 required to operate one of the advance switches 31 or 32, is four inches, regardless of the arrangement of the gauge blocks 16a—16d. It is obvious that by using additional advance switches in a similar manner, the selective advance feature may be arranged to operate the dimension selector 30 after a relatively short withdrawal of the piecepart 12.

*Operation*

The overall operation of the binary positioning device as used in conjunction with a machine tool, such as a drill press 14, will now be described. Assuming it necessary to drill a series of holes in a piecepart 12, such as a sheet of metal, binary information representing the respective dimension of each hole with respect to a reference edge of the piecepart is set in on the dimension registers, these dimensions representing one axis of a coordinate position. This is accomplished by arranging the series of switches 33—33 in each of the dimension registers 28—28 in the proper position, the closed position representing the numeral 1 and a gauge block 16a—16d to be removed, and the open position representing the numeral 0 and a gauge block 16a—16d to remain in its normal position. The reset switch 41 should be momentarily closed to assure that the dimension selector 30 is properly positioned at its starting position on the first dimension register 28. At this time the dimension selector 30 will read out the binary information on the first dimension register 28 and energize the solenoid actuators 24—24 accordingly to arrange the gauge blocks 16a—16d in the proper combination in the path of advancement of the piecepart 12. The piecepart 12 may be intermittently reciprocated by a connecting rod 15, or the like, driven by any suitable means, pausing at the end of its forward motion for a time sufficient to permit the work operation to be performed on the piecepart 12. The adjustable jigs 19—19 position the piecepart 12 along a second axis transverse to the direction of its movement and thus coordinately locate the piecepart for each drilling operation. As is readily apparent, an identical group of gauge blocks 16a—16d, as herein described, could be used in lieu of the jigs 19—19 to establish the dimensions along this axis of each coordinate position.

The piecepart 12 advances beyond the vertical axis of the drill 11 into engagement with the gauge blocks 16a—16d projecting above the work surface 13 forcing them together and in abutment with the fixed stop 18 permitting the piecepart 12 to advance a distance determined by the length of gauge blocks 16a—16d withdrawn. Upon completion of the drilling operation and partial withdrawal of the piecepart 12, the spring-biased restrainers 27—27 begin to spring any of the longitudinally displaced gauge blocks 16a—16d back to their normal position. Upon further withdrawal, the piecepart 13 trips the advance switch 31 or 32, depending upon the position from which the piecepart is withdrawn, to actuate the dimension selector 30, which in turn advances to read out the binary information on the next dimension register 28 and arrange the gauge blocks 16a—16d for the next position. This operation is repeated throughout the desired sequence. Pilot lamps 39—39 on each of the dimension registers 28—28 indicate the position of the dimension selector 30 at all times. In the event that a no-dimension switch 40 in a dimension register is closed, the dimension selector 30 will automatically advance to the next dimension register 28. To complete the versatility of the device, the reset switch 41 may be operated at any time during a sequence of operations to return the dimension selector 30 back to the starting point.

It will be understood that the above-described embodiments are merely exemplary of the principles of the invention, and as is readily apparent, the positioning device need not be limited to the use described, it oftentimes being desired to position a sheet of material with respect to a reference point at a series of dimensions or coordinate points. Further, it is not intended to limit the invention to the exact details of the construction set forth. For example, the blocks may be suspended above the work surface and withdrawn as described or as an alternative dropped into position, and although described with a certain degree of particularity, the invention embraces changes, modifications, and equivalents of the parts and their formation and arrangement as come within the purview of the appended claims.

What is claimed is:

1. A positioning device for locating a piecepart at a preselected position with respect to a working tool, which comprises a series of gauge blocks of differing lengths such that any selected length of a fixed increment up to a predetermined maximum may be formed by placing any combination of said gauge blocks into end-to-end alignment, means for supporting the gauge blocks in a first normal position in a single row, a plurality of actuating means for arranging any desired combination of said gauge blocks in end-to-end alignment in a second operating position, and means for selectively activating the actuating means to align the gauge blocks in any desired combination.

2. A positioning device for locating a piecepart at a preselected position with respect to a working tool, which comprises a plurality of gauge blocks of differing lengths such that any selected length of a fixed increment up to a predetermined maximum length may be formed by placing a combination of said gauge blocks into end-to-end alignment, means for supporting the gauge blocks in a first normal position and in a series end-to-end relationship, a plurality of electrical actuating means for arranging any desired combination of said gauge blocks in end-to-end engagement in a second operating position in the path of movement of a piecepart to be positioned such that the piecepart advances a preselected distance as determined by the arrangement of said gauge blocks, and electrical means for selectively activating said electrical actuating means to align the gauge blocks in any desired combination.

3. A positioning device for locating a piecepart at a preselected position with respect to a working tool, which comprises a plurality of gauge blocks of differing lengths such that any selected length of an even fixed increment up to a predetermined maximum may be formed by placing a combination of said gauge blocks into an end-to-end engagement, means for supporting each of said gauge blocks yieldably in a normal end-to-end engagement in the path of movement of a piecepart to be positioned, electrical actuating means for withdrawing the gauge blocks from the path of advancement of the piecepart such that the piecepart advances a distance as determined by the length of gauge blocks withdrawn, electrical means for selectively activating said electrical actuating means to align the gauge blocks in any desired combination, and resilient means for returning the gauge blocks to a normal end-to-end relation upon completion of a work operation.

4. In a machine tool of the type wherein a piecepart is advanced to a work position and withdrawn upon completion of a work operation, a binary positioning device for locating a piecepart in relation to a working tool, which comprises a plurality of gauge blocks of varying lengths such that any selected length of a fixed increment up to a predetermined maximum may be formed by placing a combination of said gauge blocks into an end-to-end relation, means for supporting the gauge blocks in end-to-end engagement in the path of movement of a piecepart to be positioned, electrical actuating means for withdrawing the gauge blocks from the path of advancement of the piecepart, a plurality of dimension registers designed to receive binary information representing each selected position and for selectively activating the electrical actuating means in accordance with the binary information therein to align the gauge blocks in a desired combination, each dimension register representing one incremental position, a selector for sequentially selecting the dimension registers, restraining means for returning the gauge blocks to a normal end-to-end relation upon completion of the work operation and withdrawal of the piecepart, and advancing means for operating the dimension selector upon a withdrawal of the piecepart from the positioning device.

5. In a machine tool, a binary positioning device for sequentially locating a piecepart in a predetermined series of preselected positions with respect to a working tool, which comprises a plurality of gauge blocks of graduated lengths such that any selected length of an even fixed increment up to a predetermined maximum may be formed by placing a combination of said gauge blocks into end-to-end alignment, a plurality of electrical actuating means for arranging any desired combination of said gauge blocks in end-to-end alignment in the path of movement of an advancing workpiece such that the piecepart advances a distance as determined by the arrangement of said gauge blocks, a plurality of dimension registers designed to receive binary information representing each selected position and for selectively activating the electrical actuating means in accordance with the binary information therein to align the gauge blocks in a desired combination, each dimension register representing one incremental position, a dimension selector for sequentially selecting the dimension registers, restraining means for returning the gauge blocks to a normal end-to-end relation upon completion of a work operation, and withdrawal of the piecepart from the positioning device, advancing means for operating said dimension selector upon the withdrawal of the piecepart to sequentially select said dimension registers, and reset means for restarting the sequence at any time during the sequence.

6. In a machine tool of the type wherein a piecepart is advanced to a work position and withdrawn upon completion of a work operation, a binary positioning device for sequentially locating the piecepart in a predetermined sequence of preselected positions with respect to the working tool, which comprises a plurality of gauge blocks disposed in the path of movement of the piecepart and abutting a fixed stop located a selected distance from the working tool, the gauge blocks being of graduated lengths such that any selected length of a fixed increment up to a predetermined maximum may be formed by placing a combination of said gauge blocks into an end-to-end engagement, electrical actuating means for withdrawing the gauge blocks from the path of movement of the piecepart, a plurality of dimension registers designed to receive a binary information representing each selected position and for selectively activating the electrical actuating means in accordance with the binary information therein to align the gauge blocks in a desired combination, each dimension register representing one position, a dimension selector for sequentially selecting the dimension registers, restraining means for returning the gauge blocks to a normal end-to-end relation upon the withdrawal of the piecepart, advancing means for operating the dimension selector upon a withdrawal of the workpiece from the machine tool to sequentially select said dimension registers, and reset means for restarting the sequence at any time during said sequence.

7. In a machine tool of the type wherein a piecepart is advanced to a work position and withdrawn upon completion of a work operation, an improved work positioning device for sequentially locating the piecepart in a predetermined sequence of preselected positions with respect to a working tool, which comprises a fixed stop located a predetermined distance from the working tool, a plurality of gauge blocks disposed in an end-to-end relation in the path of movement of the piecepart abutting and extending away from the fixed stop, the gauge blocks being of graduated lengths such that any selected length of a fixed increment up to a predetermined maximum may be formed by placing a combination of said gauge blocks into an end-to-end engagement, a plurality of solenoid actuators, an armature adjustably secured within each solenoid actuator and slidably secured to each gauge block such that the gauge block associated with each solenoid actuator will be withdrawn from the path of movement of the piecepart upon energization of said solenoid actuator, a plurality of dimension registers designed to receive bits of binary information representing each selected position and for selectively energizing the solenoid actuators in accordance with binary information set in on each dimension register to align the gauge blocks in a desired combination to position the piecepart at preselected positions with respect to the working tool, each dimension register representing one position, a dimension selector for sequentially selecting the dimension registers, restraining means for returning the gauge blocks to a normal end-to-end relation upon withdrawal of the piecepart, and selective advancing means for operating the dimension selector to sequentially select the dimension registers upon the withdrawal of the piecepart.

8. In a machine tool of the type wherein a piecepart is advanced to a work position and withdrawn upon completion of a work operation, an improved work positioning device for sequentially locating the piecepart in a predetermined sequence of preselected positions with respect to a working tool, which comprises a fixed stop located a predetermined distance from the working tool, a plurality of gauge blocks disposed in the path of movement of the piecepart and abutting the fixed stop, the gauge blocks being of graduated lengths such that any selected length of a fixed increment up to a predetermined maximum may be formed by placing a combination of said gauge blocks into an end-to end engagement, a plurality of solenoid actuators, an armature adjustably secured within each solenoid actuator and slidably secured to each gauge block such that the gauge block so associated with each solenoid actuator will be withdrawn from the path of movement of the piecepart upon energization of said solenoid actuator, a plurality of dimension registers, each of which includes a series of switches and a common voltage source, said switches being connected to the common voltage source on the one side and a respective solenoid actuator on the other, each of said switches representing one bit of binary information, the numeral "1" in its closed position and the numeral "0" in its open position, for selectively activating the electrical actuating means in accordance with the binary information set in the dimension register, as determined by the position of said switches, to align the gauge blocks in a desired combination so as to position the piecepart at preselected incremental positions with respect to the working tool, each dimension register representing one position, a dimension selector for sequentially reading out the dimension registers, restraining means for returning the gauge blocks to a normal end-to-end relation upon withdrawal of the piecepart, selective advancing means for operating the dimension selector to sequentially select the dimension registers upon a withdrawal of the piecepart depending upon the position from which withdrawn, and reset means for restarting the sequence at any time during said sequence.

9. In a binary positioning device for sequentially locating a piecepart with respect to a machine tool at a series of preselected positions and of the type wherein the piecepart is advanced a preselected distance to each work position and withdrawn upon the completion of such work operation, a selective advance device which comprises a plurality of advancing switches displaced along the path of movement of the piecepart, each switch for advancing the positioning device to the next preselected position upon a withdrawal of the piecepart from each work position, and relay means cooperatively connecting the advancing switches for operating only one of said advancing switches upon the withdrawal of the piecepart depending upon the work position from which the piecepart is withdrawn.

10. In a binary positioning device for sequentially locating a piecepart with respect to a machine tool at a series of preselected positions and of the type wherein the piecepart is advanced a preselected distance to each work position and withdrawn upon the completion of such work operation, a selective advance device which comprises a first switch positioned along the path of movement of the piecepart for advancing the positioning device to the next preselected work position upon a complete withdrawal of the piecepart from the positioning device, a second switch for advancing the positioning device to the next preselected work position upon less than a complete withdrawal of the piecepart from the positioning device, and relay means cooperatively connecting the switches to cause one or the other of said switches to be operated to advance the positioning device to the next preselected work position upon the withdrawal of the piecepart depending upon the work position from which the piecepart is withdrawn.

11. In a device for permutatively positioning a series of gauge blocks, means for supporting said gauge blocks in alignment and for movement in a predetermined direction, means for selectively moving any permutation of support means to withdraw a permutation of blocks, and means for applying a force in the predetermined direction to move the aligned blocks over the withdrawn permutation of blocks.

12. In a system for controlling the successive permutative positioning of a series of gauge blocks, means for supporting said blocks in alignment, means for selectively withdrawing any permutation of blocks from the aligned position, said supporting means including facilities that permit the aligned blocks to move over the withdrawn blocks, means for setting the selective means to successively withdraw different permutations of blocks, and means for operating said setting means to successively withdraw different permutations of blocks.

13. In a device for selectively positioning a series of gauge blocks, each of said blocks having a T-slot formed in the undersurface thereof to provide a continuous T-slot channel, a series of armatures each having an enlarged head projecting into one of said T-slots for supporting said blocks in alignment, a series of solenoids for controlling the position of the armatures, a series of settable circuits for controlling the permutative energization of said solenoids, stepping means for successively operating said series of circuits to energize permutations of said solenoids to withdraw permutations of said blocks, means for applying a force to each group of aligned blocks to advance said blocks relative to said armature and over said withdrawn blocks, and means controlled by said force-applying means for operating said stepping means.

References Cited in the file of this patent

UNITED STATES PATENTS 2,908,978   Knosp et al. _____ Oct. 20, 1959

FOREIGN PATENTS 767,539   Great Britain _____ Feb. 6, 1957